(12) United States Patent
Osawa et al.

(10) Patent No.: US 11,871,782 B2
(45) Date of Patent: Jan. 16, 2024

(54) MULTIFILTER SEGMENT, SMOKING ARTICLE WITH MULTIFILTER SEGMENT, AND MULTIFILTER SEGMENT INSPECTION METHOD

(71) Applicant: JAPAN TOBACCO INC., Tokyo (JP)

(72) Inventors: Noriko Osawa, Tokyo (JP); Yuji Yamauchi, Tokyo (JP); Ryoko Ogi, Tokyo (JP)

(73) Assignee: JAPAN TOBACCO INC., Tokyo (JP)

(*) Notice: Subject to any disclaimer, the term of this patent is extended or adjusted under 35 U.S.C. 154(b) by 143 days.

(21) Appl. No.: 16/912,480

(22) Filed: Jun. 25, 2020

(65) Prior Publication Data

US 2020/0323260 A1 Oct. 15, 2020

Related U.S. Application Data

(63) Continuation of application No. PCT/JP2017/046775, filed on Dec. 26, 2017.

(51) Int. Cl.
A24D 3/04 (2006.01)
A24D 1/02 (2006.01)
(Continued)

(52) U.S. Cl.
CPC ............... *A24D 3/04* (2013.01); *A24D 1/02* (2013.01); *A24D 3/025* (2013.01); *D21H 27/08* (2013.01); *G01N 21/59* (2013.01)

(58) Field of Classification Search
CPC .......... A24D 3/041; A24D 3/043; A24D 3/04; A24D 3/063; A24D 3/10; A24D 3/0275; A24D 3/048; A24D 3/062; A24D 3/163; A24D 1/027; A24D 1/20; A24D 1/025; A24D 3/0291; A24D 3/065; A24D 3/067;
(Continued)

(56) References Cited

U.S. PATENT DOCUMENTS

2007/0215168 A1* 9/2007 Banerjee .................. A24D 1/22 131/335
2016/0208440 A1* 7/2016 Byrd, Jr. ............ B65D 85/1045

FOREIGN PATENT DOCUMENTS

CN 104780792 A 7/2015
EP 2745719 A1 6/2014
(Continued)

OTHER PUBLICATIONS

Extended European Search Report for European Application No. 17936294.2, dated Jul. 20, 2021.
(Continued)

*Primary Examiner* — Kelly M Gambetta
*Assistant Examiner* — Stephanie Lynn Moore
(74) *Attorney, Agent, or Firm* — Birch, Stewart, Kolasch & Birch, LLP

(57) ABSTRACT

This multifilter segment is provided with a plurality of filter segments provided with a plurality of filter materials and inner wrappers respectively covering the outer surfaces of the plurality of filter materials, and an outer wrapper which connects and integrates the plurality of filter segments by being wound around the outer surfaces of the inner wrappers of the plurality of filter segments while the ends of the plurality of filter segments are arranged face-to-face. The inner wrappers of adjacent filter segments have a mutually different CIELab color parameter.

8 Claims, 3 Drawing Sheets

(51) Int. Cl.
*A24D 3/02* (2006.01)
*D21H 27/08* (2006.01)
*G01N 21/59* (2006.01)

(58) Field of Classification Search
CPC .......... A24D 1/02; A24D 1/002; A24D 1/042; A24D 3/0216; A24D 3/0283; A24D 3/061; A24D 3/14; A24D 3/18; A24F 1/12; A24F 2700/03; A24F 40/20; A24C 5/52; A24C 5/56
See application file for complete search history.

(56) References Cited

FOREIGN PATENT DOCUMENTS

| EP | 2 818 060 A1 | 12/2014 | |
|----|----|----|----|
| JP | 5699244 B2 | 4/2015 | |
| JP | 2015-522285 A | 8/2015 | |
| TW | I522050 B | 2/2016 | |
| WO | WO 2014/012917 A2 | 1/2014 | |
| WO | WO-2014012917 A2 * | 1/2014 | ............. A24D 3/041 |

OTHER PUBLICATIONS

Taiwanese Office Action and Search Report for Taiwanese Application No. 106146256, dated Nov. 27, 2020, with English translation.
Chinese Office Action and Search Report for corresponding Chinese Application No. 201780098058.6, dated Aug. 20, 2021, with English translation.
International Search Report issued in PCT/JP2017/046775 (PCT/ISA/210), dated Apr. 3, 2018.
Korean Office Action for Korean Application No. 10-2020-7018110, dated Jun. 9, 2022, with an English translation.

* cited by examiner

MULTIFILTER SEGMENT, SMOKING ARTICLE WITH MULTIFILTER SEGMENT, AND MULTIFILTER SEGMENT INSPECTION METHOD

CROSS-REFERENCE TO RELATED APPLICATIONS

This application is a Continuation Application of PCT Application No. PCT/JP2017/046775, filed Dec. 26, 2017, the entire contents of which are incorporated herein by reference.

BACKGROUND OF THE INVENTION

1. Field of the Invention

The present invention relates generally to a multifilter segment, a smoking article with a multifilter segment, and a multifilter segment inspection method.

2. Description of the Related Art

A smoking article with a filter, for example, a conventional filtered cigarette is formed of a filter and a cigarette rod which are integrated with each other. A filter material formed by bundling or folding non-woven fabrics containing cellulose acetate fibers or pulp is wrapped with a filter wrapper and formed in the shape of a rod, and the filter is thereby formed. Dried tobacco leaves are wrapped with cigarette paper and formed in the shape of a rod, and the cigarette rod is thereby formed. In a state where an end of the filter and an end of the cigarette rod are abutted against each other, tipping paper is wrapped over the entire circumference so as to bond the filter and the cigarette rod together, and the filter and the cigarette rod are thereby integrated with each other. At that time, the tipping paper is wrapped around a filter side end part of the cigarette rod and the filter and connects the cigarette rod and the filter.

In recent years, filters used for smoking articles have become diversified in connection with a health risk, a demand for a mild smoking taste or a wide variety of smoking flavoring tastes, etc. A filter formed by arranging a plurality of filters face-to-face, referred to as a multifilter segment, has been known. The multifilter segment is formed by, for example, arranging the end portion of a filter segment formed by covering the outer surface of a filter material with an inner wrapper so as to face the end portion of the other filter segment, winding an outer wrapper onto the outer circumferential surfaces of the two filter segments and connecting and integrating the two filter segments.

The filter material is formed of, for example, cellulose acetate fibers, and may contain other components (for example, a plasticizer such as triacetin, an adsorbent such as activated carbon, an aroma chemical such as menthol, a size agent, a thermal stabilization agent, a yield improvement agent and an adhesive). Each filter segment may have a cavity segment internally having a cavity, or a center-hole structure formed by, for example, paper core. In the cavity, for example, a capsule containing liquid or powdery flavor ingredients may be retained.

For example, Patent Literature 1 (JP 5699244 B) discloses a multisegment with a filter section. The multisegment comprises an inner wrapper having an increased loading material such as calcium carbonate and having high opacity. The filter section is wrapped with an inner wrapper having high opacity in which a black absorbent such as activated carbon is dispersed in a material formed by bundling or folding a nonwoven cloth formed of acetate fibers or pulp. In this structure, the multifilter segment wrapped with an outer wrapper and tipping paper does not allow the black absorbent to be seen through and brings about an effect which can impart white cleanliness.

In general, a multifilter segment is formed by aligning and providing cut filter segments at regular intervals in a combiner, arranging the end portions of the filter segments face-to-face, subsequently winding an outer wrapper and integrating them. The length of each filter segment is in a broad range of 5 to 50 mm. In a multifilter segment, as the structure becomes more complex, a possibility that a defect in the length of each filter segment, the face-to-face state between filter segments, etc., is caused is increased. Therefore, an inspection for determining whether the state of a multifilter segment is good or bad by detecting the length of each filter segment of the multifilter segment, the face-to-face state between the filter segments, etc., is needed.

When the state of a multifilter segment using an inner wrapper in which the opacity is increased as described above is inspected, the opacity of the inner wrapper may be used to detect the length of each filter segment, the face-to-face state between the filter segments, etc., for the determination of the good or bad regarding whether or not each filter has a predetermined length and whether or not the face-to-face state is normal.

BRIEF SUMMARY OF THE INVENTION

However, the inspection of the state of a multifilter segment may be affected by physical property other than the opacity of an inner wrapper. In such a case, in the inspection using the opacity of the inner wrapper as described above, for example, the length of each filter segment or the face-to-face state between the filter segments cannot be detected with high accuracy. Thus, the correct determination of whether the state of the multifilter segment is good or bad may be difficult.

When an inner wrapper having high opacity is manufactured at high speed, the loading material contained in the inner wrapper may fall on a manufacturing machine. Thus, the frequency of cleaning may be increased.

The present invention aims to provide a multifilter segment, a smoking article with a multifilter segment, and a multifilter segment inspection method, allowing the detection of the length of each filter segment, the face-to-face state between the filter segments, etc., with high accuracy.

The present invention provides a multifilter segment comprising: a plurality of filter segments comprising a plurality of filter materials and inner wrappers respectively covering outer surfaces of the filter materials; and an outer wrapper which connects and integrates the filter segments by being wound around outer surfaces of the inner wrappers of the filter segments while end portions of the filter segments are arranged face-to-face. The inner wrappers of the adjacent filter segments have CIELab color parameters different from each other.

The present invention provides a smoking article with a multifilter segment, comprising the above multifilter segment.

The present invention provides a multifilter segment inspection method comprising: a) a step of preparing a plurality of filter segments in which outer surfaces of filter materials are covered with inner wrappers; b) a step of selecting filter segments from the plurality of filter segments such that CIELab color parameters of the inner wrappers of filter segments to be adjacent to each other are different from each other, causing red, blue or green light or light having a combination of two or more types to pass through each of the filter segments to be adjacent to each other, and measuring a transmitted light intensity ratio in each color; c) a step of calculating the transmitted light intensity ratio by dividing a high transmitted light intensity in a color of one of the filter segments to be adjacent to each other by a low transmitted light intensity in the color of the other filter segment; d) a step of selecting a combination of filter segments in which the transmitted light intensity ratio calculated in the c) step between the filter segments to be adjacent to each other is greater than or equal to 1.6, and a color of used light in advance; e) a step of assembling a multifilter segment in which a plurality of filter segments are connected and integrated by winding an outer wrapper which does not affect a color transparency of the adjacent filter segments which satisfy the transmitted light intensity ratio of 1.6 or greater around outer surfaces of the inner wrappers by arranging the filter segments of the combination selected in the d) step face-to-face; and f) a step of causing the light of the color selected in the d) step to pass through the multifilter segment and detecting a length of the adjacent filter segments and a face-to-face state between the filter segments.

According to the present invention, the detectability of the length of each filter segment of a multifilter segment, the face-to-face state between the filter segments, etc., can be improved.

Further, according to the present invention, the detectability of the length of each filter segment of a smoking article with a multifilter segment, the face-to-face state between the filter segments, etc., can be improved, and the property of design can be also improved.

Moreover, according to the present invention, a multifilter segment inspection method allows the improvement of the detectability of the length of each filter segment, the face-to-face state between the filter segments, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Some embodiments will be described hereinafter with reference to the accompanying drawings. The same structures will be denoted by the same references throughout the embodiments, and duplicate descriptions will be omitted. In addition, the drawings are schematic illustrations for facilitating understanding of the embodiments, and the shapes, dimensions, ratios and the like of the respective parts may be different from actual ones. In the present specification, terms "upstream" and "downstream" will be appropriately used with reference to a direction in which mainstream smoke flows when a filtered smoking article is smoked.

First Embodiment

Figure 1:
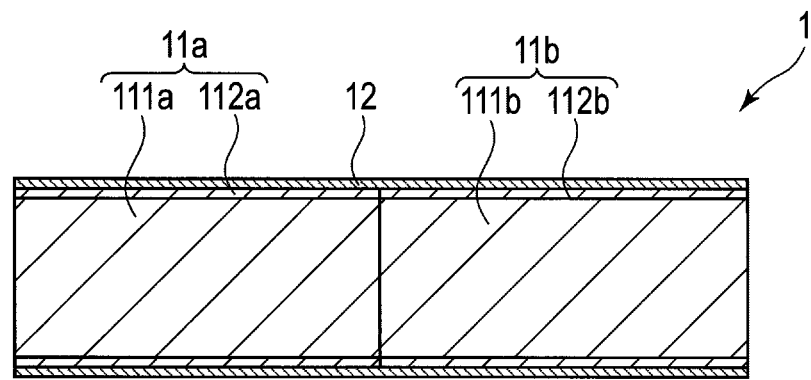
FIG. 1 is a schematic cross-sectional view of a multifilter segment according to a first embodiment.

FIG. 1 is a schematic cross-sectional view of a multifilter segment 1 according to a first embodiment. The multifilter segment 1 comprises two filter segments 11a and 11b. Specifically, the multifilter segment 1 is what is called a dual filter comprising the first and second filter segments 11a and 11b adjacent to each other.

The first filter segment 11a comprises a first filter material 111a, and a first inner wrapper 112a covering the outer surface of the first filter material 111a. The second filter segment 11b comprises a second filter material 111b, and a second inner wrapper 112b covering the outer surface of the second filter material 111b. An end portion of the first filter segment 11a is provided so as to face an end portion of the second filter segment 11b. An outer wrapper 12 is wound around the outer surfaces of the first and second inner wrappers 112a and 112b, thereby connecting and integrating the first and second filter segments 11a and 11b. In this way, the multifilter segment 1 is structured.

The first and second filter materials 111a and 111b are formed of, for example, cellulose acetate fibers, and may contain other components (for example, a plasticizer such as triacetin, an adsorbent such as activated carbon, an aroma chemical such as menthol, a size agent, a thermal stabilization agent, a yield improvement agent and an adhesive). Each of the first and second filter segments 11a and 11b may have a cavity segment internally having a cavity, or a center-hole structure formed by, for example, paper core. In the cavity, for example, a capsule containing liquid or powdery flavor ingredients may be retained.

As the material of the outer wrapper 12, for example, paper having a basis weight of 20 to 100 gsm, a thickness of 30 to 100 µm and an opacity of 70% or less, glassine paper, parchment paper, paraffin paper, cellophane, a polypropylene film, a polyvinyl chloride film, a cellulose acetate film, etc., can be used. For example, the outer wrapper 12 may only have opacity less than or equal to a certain value.

The first and second inner wrappers 112a and 112b adjacent to each other have CIELab color parameters different from each other. The CIELab color parameters (lightness L*, chromaticity a*, chromaticity b*) of the first and second inner wrappers 112a and 112b can be measured using a spectrophotometer (manufacturer: X-Rite, Inc., product name: SpectroEye).

For the first and second inner wrappers 112a and 112b having different CIELab color parameters, the following forms (1) to (3) are considered.

(1) The first and second inner wrappers 112a and 112b adjacent to each other contain pulp having bleaching strengths different from each other.

The pulp may be, for example, either wood pulp or non-wood pulp formed by pulping a plant such as bamboo other than wood pulp. The wood pulp is manufactured by mechanically and chemically processing, for example, a material from which the bark of the trunk of wood is removed or which is prepared by cutting the bark into small pieces (chipping).

The bleaching strength can be adjusted by controlling, for example, the type, amount and bleaching time of the bleaching agent used when wood pulp is bleached. The bleaching agent is, for example, an oxidant or a reducing agent such as oxygen, hydrogen peroxide, ozone, carbon dioxide, caustic soda or sodium hypochlorite.

Only the wood pulp contained in one of the first and second inner wrappers 112a and 112b (for example, the first inner wrapper 112a) may be bleached.

(2) The first and second inner wrappers 112a and 112b adjacent to each other contain bleached pulp and unbleached pulp, and have blending ratios different from each other regarding bleached pulp and unbleached pulp.

The unbleached pulp is, for example, unbleached chromatic wood pulp having a brownish-red hue derived from the raw material. The bleached pulp is prepared by, for example, bleaching wood pulp by a bleaching agent.

(3) At least one surface of at least one of the first and second inner wrappers 112a and 112b adjacent to each other is colored.

For example, both surfaces of one of the inner wrappers (for example, the first inner wrapper 112a) may be colored. One surface or both surfaces of both the first inner wrapper 112a and the second inner wrapper 112b may be colored.

In the above form (3), it is preferable that, in at least one of the first and second inner wrappers 112a and 112b adjacent to each other, the inner surface which is in contact with the filter material should be colored.

For example, in each of the first and second inner wrappers 112a and 112b, the inner surface which is in contact with the first or second filter material 111a or 111b may be colored. In one of the inner wrappers (for example, the first inner wrapper 112a), the inner surface which is in contact with the first filter material 111a may be colored.

The multifilter segment 1 in which the first and second inner wrappers 112a and 112b adjacent to each other have CIELab color parameters different from each other as described above is allowed to detect, for example, the length of each of the first and second filter segments 11a and 11b and the face-to-face state between the filter segments 11a and 11b with high accuracy in the multifilter segment inspection method of the third embodiment described later. Thus, the multifilter segment 1 is allowed to accurately determine whether the state of the multifilter segment is good or bad.

The CIELab color parameters of the first and second inner wrappers 112a and 112b adjacent to each other should be preferably different from each other such that the transmitted light intensity ratio is greater than or equal to 1.6 when red, blue or green light or light having a combination of two or more types passes through the first and second filter segments 11a and 11b adjacent to each other. At this time, it is preferable that the outer wrapper 12 wound around the outer surfaces of the first and second inner wrappers 112a and 112b should not affect the color transparency of the adjacent first and second filter segments 11a and 11b which satisfy a transmitted light intensity ratio of 1.6 or greater.

The multifilter segment 1 comprising this structure is allowed to detect, for example, the length of each of the first and second filter segments 11a and 11b and the face-to-face state between the filter segments 11a and 11b with higher accuracy in the multifilter segment inspection method of the third embodiment.

The multifilter segment of the present embodiment explained above may comprise other structures. For example, the first filter segment 11a and the second filter segment 11b may be provided at a desired interval. A capsule and sweet-tasting material may be provided in a cavity located between the first filter segment 11a and the second filter segment 11b. A third filter segment may be further provided such that three filter segments are integrated face-to-face.

Second Embodiment

Now, a smoking article with a multifilter segment according to a second embodiment will be described. Here, as an example of a smoking article with a multifilter segment, a cigarette with a multifilter segment will be described.

Figure 2:
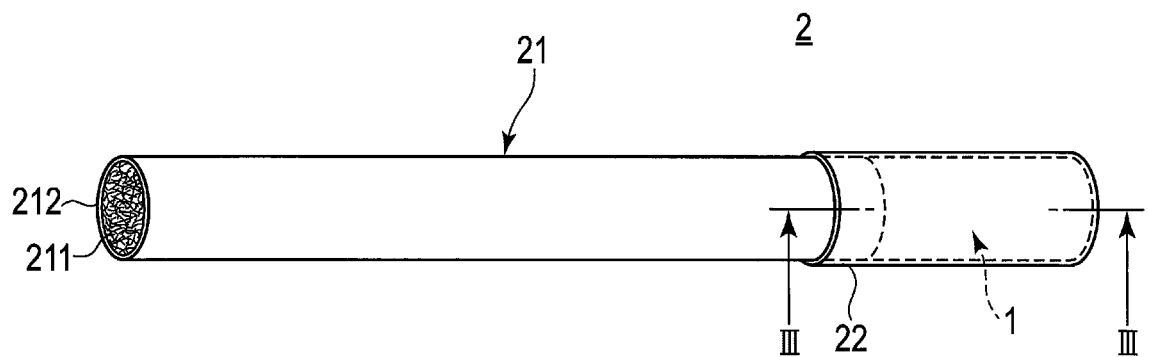
FIG. 2 is a schematic perspective view of a cigarette with a multifilter segment according to a second embodiment.
Figure 3:
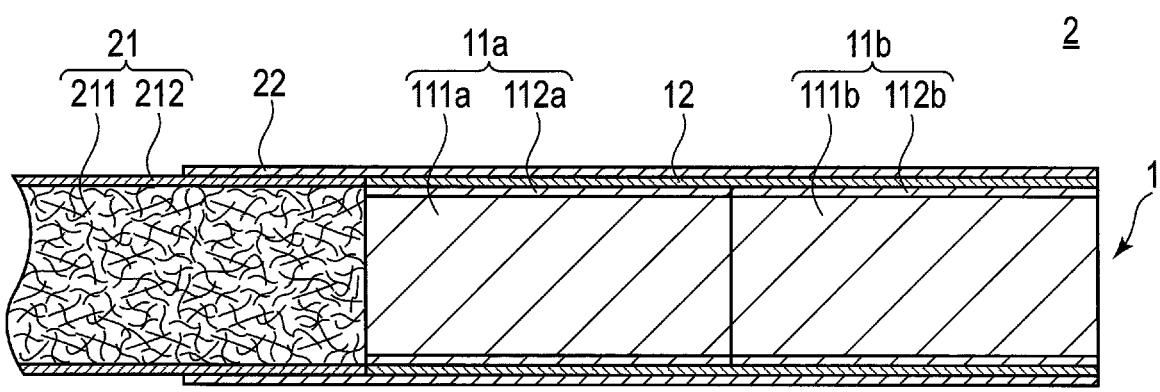
FIG. 3 is a schematic cross-sectional view in which the cross-sectional surface taken along the III-III line of FIG. 2 is enlarged.

FIG. 2 is a schematic perspective view of a cigarette 2 with a multifilter segment according to the second embodiment. FIG. 3 is a schematic cross-sectional view in which the cross-sectional surface taken along the III-III line of FIG. 2 is enlarged. As shown in FIG. 2, the cigarette 2 with the multifilter segment comprises the multifilter segment 1, a cigarette rod 21 and tipping paper 22.

In a manner similar to that of a common cigarette, the cigarette rod 21 comprises cut tobacco 211, and cigarette paper 212 wound around the cut tobacco 211. The cigarette paper 212 is, for example, air permeable paper.

The multifilter segment 1 is provided at the downstream end of the cigarette rod 21. The multifilter segment 1 has the same or substantially the same diameter as the cigarette rod 21.

The tipping paper 22 is wound around the downstream end portion of the cigarette rod 21 and the outer circumferential surface of the multifilter segment 1 and connects the cigarette rod 21 and the multifilter segment 1. The tipping paper 22 causes the cigarette rod 21 to adhere to the multifilter segment 1 by an adhesive such as paste.

For the material of the tipping paper 22, paper having a basis weight of 30 to 100 gsm and a thickness of 20 to 100 µm is used. For example, glassine paper, parchment paper, paraffin paper, cellophane, a polypropylene film, a polyvinyl chloride film, a cellulose acetate film and the like may be used.

The cigarette 2 with the multifilter segment according to the second embodiment comprises the multifilter segment comprising adjacent first and second inner wrappers having CIELab color parameters different from each other as explained in the first embodiment. Thus, the cigarette 2 with the multifilter segment brings about the effects listed below.

(1) In the cigarette 2 with the multifilter segment, when at least one of the first and second inner wrappers 112a and 112b is colored, a smoker can visually confirm the difference in the color of the inner wrappers from the outside of the tipping paper 22. Thus, a good property of design can be visually confirmed.

(2) By coloring the inside of the second inner wrapper 112b of a second filter segment 11b provided on the downstream end (suction end) side, a colored filter material 111b can be visually confirmed from the suction end side. Thus, a good property of design can be visually confirmed.

(3) When tipping paper is not wound around the downstream end (suction end) side of the multifilter segment 1, and tipping paper is wound around only the upstream end side, a smoker can visually confirm the property of design in which a plurality of colors are applied to the multifilter segment 1.

(4) When tipping paper in which part of itself is cut out is used, the color of the inner wrappers can be visually confirmed from the cut portion. Thus, a good property of design can be visually confirmed.

The cigarette with the filter in the above embodiment may comprise other structures. For example, a plurality of holes (ventilation holes) penetrating the tipping paper to the filter may be provided. These ventilation holes function to supply air from the outside to the inside of the filter.

In the above embodiment, as an example of a smoking article with a filter, a cigarette with a filter is explained. However, the smoking article with the filter is not limited to this example. The smoking article with the filter may be another smoking article to which a filter is connected, such as a cigar, a cigarillo, a non-combustion smoking article utilizing electric heating/chemical reaction heat, a non-heating smoking article.

Third Embodiment

Figure 4:
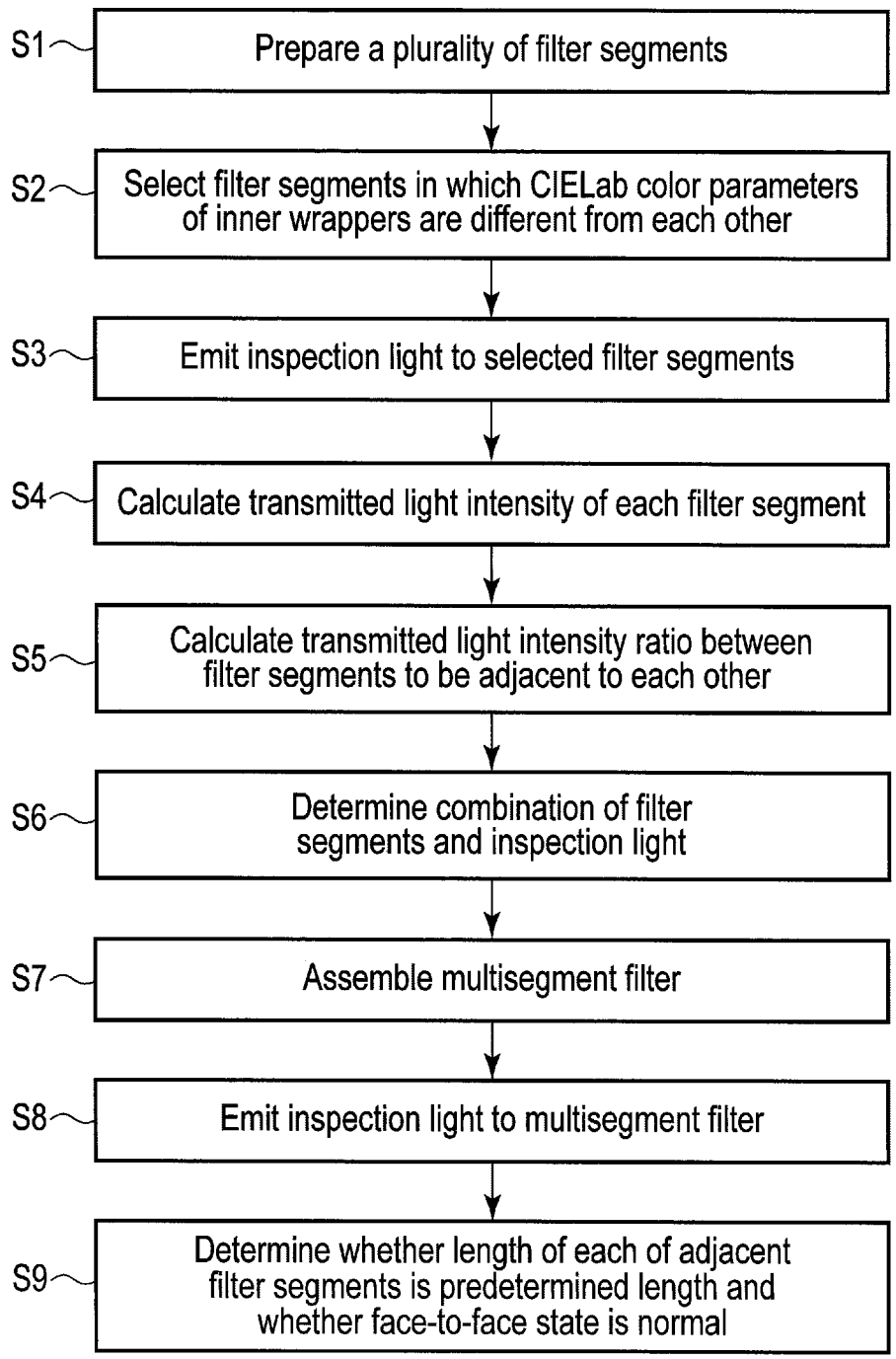
FIG. 4 is a flowchart explaining the procedure of a multifilter segment inspection method according to a third embodiment.

Now, a multifilter segment inspection method according to a third embodiment will be described. FIG. 4 is a flowchart explaining the procedure of the multifilter segment inspection method according to the third embodiment.

Firstly, a plurality of filter segments in which the outer surfaces of filter materials are covered with inner wrappers are prepared (step S1).

From the plurality of filter segments, the filter segments to be adjacent to each other are selected such that the CIELab color parameters of the inner wrappers of the filter segments to be adjacent to each other differ from each other (step S2).

Subsequently, each of the filter segments selected in step S2 is irradiated with red inspection light, blue inspection light and green inspection light three times respectively (step S3). For example, red light is a red light-emitting diode (LED) in which the wavelength peak is 630 nm. Green light is a green LED in which the wavelength peak is 525 nm. Blue light is a blue LED in which the wavelength peak is 450 nm. Thus, three light sources are provided. Monochromatic inspection light, for example, red inspection light, is generated by an adjustment such that the red LED is output at a maximum and neither the green LED nor the blue LED is output.

Subsequently, the red, blue and green inspection light (transmitted light) which passed through the filter segments in step S3 is received. The mean value of the amount of transmitted light for each inspection light measured three times is calculated (step S4).

Subsequently, the high transmitted light intensity in a color of one of the filter segments to be adjacent to each other is divided by the low transmitted light intensity in the color of the other filter segment. In this way, the transmitted light intensity ratio in the inspection light of each color is calculated (step S5).

Subsequently, the combination of the filter segments to be adjacent to each other in which the transmitted light intensity ratio calculated in step S5 between the filter segments to be adjacent to each other is greater than or equal to 1.6 and the color of the used light are selected in advance (step S6).

Subsequently, the filter segments of the selected combination are arranged face-to-face. An outer wrapper which does not affect the color transparency of the adjacent filter segments which satisfy a transmitted light intensity ratio of 1.6 or greater is wound around the outer surfaces of the inner wrappers. In this way, a multifilter segment in which a plurality of filter segments are connected and integrated is assembled (step S7).

Subsequently, the multifilter segment assembled in step S7 is irradiated with the inspection light of the color selected in step S6 (step S8).

Subsequently, the light which passed through the adjacent filter segments and the outer wrapper is received. Based on the transmitted light intensity ratio between the adjacent filter segments, the lengths of the adjacent filter segments and the face-to-face state between the filter segments are detected. Whether or not the length of each of the adjacent filter segments is a predetermined length and whether or not the face-to-face state is normal are determined (step S9). This determination can be performed by using, for example, an image processing device (CV5500 manufactured by Keyence Corporation).

Thus, according to the multifilter segment inspection method of the third embodiment, it is possible to determine the good or bad regarding whether or not the length of each of the adjacent filter segments of the multifilter segment is a predetermined length and whether or not the face-to-face state is normal with high accuracy.

Other than red, blue and green light, the light of a combination of two or more types may be emitted. For example, when the red LED and the green LED are mixed with the same ratio, yellow is obtained. Regarding the change in the contrasting density, the output amount of each light source is adjusted without changing the ratio between the red LED and the green LED. When the red LED and the blue LED are mixed with the same ratio, pink is obtained.

Hereinafter, the examples of the present invention are explained in detail.

Examples 1 to 5

Firstly, a material prepared by adding a 7% plasticizer (triacetin) by weight to acetate tow having a Y-shaped cross-sectional surface in which the single fineness is 5.9 g/9000 m and the total fineness is 35000 g/9000 m is prepared as a cylindrical filter material having a circumference of approximately 24 mm and a length of 15 mm. White paper (three types, specifically, the product name of 50NFB, the product name of 35NFB and the product name of P-10000), white plain paper and paper containing unbleached pulp are prepared as inner wrappers, respectively. On one surface of the plain paper, the white paper of the product name of 35NFB and the white paper of the product name of P-10000, one of red, blue, yellow, black and unbleached color is printed. The unbleached color is, for example, the color of paper containing unbleached pulp, specifically, paper having a CIELab color system parameter in which lightness L* is 82 to 87 and chromaticity a* is 0.1 to 0.6 and chromaticity b* is 7.9 to 18.4. Each of the above inner wrappers is cut out so as to have dimensions of 15 mm×30 mm in height and width.

In the paper of the product name of 50NFB, the basis weight is 50.0 gsm, and the thickness is 52 µm. In the paper of the product name of 35NFB, the basis weight is 35.0 gsm, and the thickness is 40 µm. In the paper of the product name of P-10000, the basis weight is 24.0 gsm, and the thickness is 60 µm. In the white plain paper, the basis weight is 24.0 gsm, and the thickness is 32 µm.

Subsequently, the inner wrapper formed of the white paper (the product name of 50NFB) is wound around the outer circumference of acetate tow, and is attached by paste. In this way, a first filter segment is prepared.

Subsequently, regarding the inner wrapper prepared by printing (applying) one of red, blue, yellow, black and unbleached color on (to) one surface of each of the plain paper, the product name of 35NFB and the product name of P-10000, the printed surface (colored surface) is placed on the acetate tow side. The inner wrapper is wound around the outer circumference of acetate tow, and is attached by paste. In this way, a second filter segment having a color selected from red, blue, yellow, black and unbleached color is prepared. Further, the inner wrapper formed of the paper containing unbleached pulp is wound around the outer circumference of acetate tow, and is attached by paste. In this way, a second filter containing unbleached pulp is prepared.

Subsequently, the first filter segment and the second filter segment using the inner wrapper formed of plain paper having one surface on which red, blue, yellow, black or unbleached color is printed are arranged face-to-face. An outer wrapper formed of white water-resistance paper (having a basis weight of 26.5 gsm and a thickness of 48 μm) is wound around the outer surfaces of the inner wrappers of the first and second filter segments. These filter segments are connected and integrated. In this way, each of the multifilter segments of examples 1 to 5 is assembled.

<Evaluation: Determination of Good or Bad in State of Each Multifilter Segment>

The evaluation explained below is conducted, using the multifilter segments of examples 1 to 5.

The multifilter segments of examples 1 to 5 are irradiated with red, blue or green inspection light. The evaluation is conducted based on the intensity ratio of the light which passed through the multifilter segments (transmitted light intensity ratio).

In the determination of whether the state of each multifilter segment is good or bad, when the determination of whether or not the length of each filter segment of each multifilter segment is a predetermined length and whether or not the face-to-face state is normal can be performed, the evaluation is "A". When the determination of whether or not the length of each filter segment of each multifilter segment is a predetermined length and whether or not the face-to-face state is normal cannot be performed, the evaluation is "B". The results are shown in the following table 1.

TABLE 1

| Examples | First Filter Segment | Second Filter Segment | Inspection Light | Transmitted Light Intensity Ratio | Determination |
|---|---|---|---|---|---|
| 1 | White | Red | Red | 1.4 | B |
|   |   |   | Green | 14.8 | A |
|   |   |   | Blue | 17.4 | A |
| 2 |   | Blue | Red | 3.7 | A |
|   |   |   | Green | 7.6 | A |
|   |   |   | Blue | 4.0 | A |
| 3 |   | Yellow | Red | 26.0 | A |
|   |   |   | Green | 1.7 | A |
|   |   |   | Blue | 28.2 | A |
| 4 |   | Black | Red | 16.8 | A |
|   |   |   | Green | 15.7 | A |
|   |   |   | Blue | 14.7 | A |
| 5 |   | Unbleached Color | Red | 2.9 | A |
|   |   |   | Green | 5.4 | A |
|   |   |   | Blue | 8.6 | A |

Examples 6 to 10

The first filter segment and the second filter segment using an inner wrapper formed of the paper of the product name of 35NFB having one surface on which red, blue, yellow, black or unbleached color is printed are arranged face-to-face. An outer wrapper formed of white water-resistance paper (having a basis weight of 26.5 gsm and a thickness of 48 μm) is wound around the outer surfaces of the inner wrappers of the first and second filter segments. These filter segments are connected and integrated. In this way, each of the multifilter segments of examples 6 to 10 is assembled.

The multifilter segments of examples 6 to 10 are evaluated by the same method as examples 1 to 5. The results are shown in the following table 2.

TABLE 2

| Examples | First Filter Segment | Second Filter Segment | Inspection Light | Transmitted Light Intensity Ratio | Determination |
|---|---|---|---|---|---|
| 6 | White | Red | Red | 1.1 | B |
|   |   |   | Green | 27.7 | A |
|   |   |   | Blue | 10.7 | A |
| 7 |   | Blue | Red | 10.3 | A |
|   |   |   | Green | 2.7 | A |
|   |   |   | Blue | 1.4 | B |
| 8 |   | Yellow | Red | 0.9 | B |
|   |   |   | Green | 1.5 | B |
|   |   |   | Blue | 14.0 | A |
| 9 |   | Black | Red | 46.6 | A |
|   |   |   | Green | 52.4 | A |
|   |   |   | Blue | 42.1 | A |
| 10 |   | Unbleached Color | Red | 1.7 | A |
|   |   |   | Green | 2.7 | A |
|   |   |   | Blue | 3.9 | A |

Examples 11 to 16

The first filter segment and the second filter segment using an inner wrapper formed of the paper of P-10000 having one surface on which red, blue, yellow, black or unbleached color is printed are arranged face-to-face. An outer wrapper formed of white water-resistance paper (having a basis weight of 26.5 gsm and a thickness of 48 μm) is wound around the outer surfaces of the inner wrappers of the first and second filter segments. These filter segments are connected and integrated. In this way, each of the multifilter segments of examples 11 to 15 is assembled.

Further, the first filter segment and the second filter segment using an inner wrapper formed of paper containing unbleached pulp are arranged face-to-face. An outer wrapper formed of white water-resistance paper (having a basis weight of 26.5 gsm and a thickness of 48 μm) is wound around the outer surfaces of the inner wrappers of the first and second filter segments. These filter segments are connected and integrated. In this way, the multifilter segment of example 16 is assembled.

The multifilter segments of examples 11 to 16 are evaluated by the same method as examples 1 to 5. The results are shown in the following table 3.

TABLE 3

| Examples | First Filter Segment | Second Filter Segment | Inspection Light | Transmitted Light Intensity Ratio | Determination |
|---|---|---|---|---|---|
| 11 | White | Red | Red | 1.1 | B |
|   |   |   | Green | 14.3 | A |
|   |   |   | Blue | 7.9 | A |

TABLE 3-continued

| Examples | First Filter Segment | Second Filter Segment | Inspection Light | Transmitted Light Intensity Ratio | Determination |
|---|---|---|---|---|---|
| 12 | | Blue | Red | 22.8 | A |
| | | | Green | 4.6 | A |
| | | | Blue | 2.2 | A |
| 13 | | Yellow | Red | 1.0 | B |
| | | | Green | 1.5 | B |
| | | | Blue | 26.1 | A |
| 14 | | Black | Red | 12.5 | A |
| | | | Green | 13.6 | A |
| | | | Blue | 5.9 | A |
| 15 | | Unbleached Color | Red | 1.8 | A |
| | | | Green | 2.9 | A |
| | | | Blue | 4.3 | A |
| 16 | | Unbleached Pulp | Red | 1.2 | B |
| | | | Green | 1.7 | A |
| | | | Blue | 2.0 | A |

Comparative Example 1

The first filter segment using an inner wrapper formed of white paper having an opacity of 57% and the second filter segment using an inner wrapper formed of white paper having an opacity of 85% are arranged face-to-face. An outer wrapper formed of white water-resistance paper (having a basis weight of 26.5 gsm and a thickness of 48 μm) is wound around the outer surfaces of the inner wrappers of the first and second filter segments. These filter segments are connected and integrated. In this way, the multifilter segment of comparative example 1 is assembled.

The multifilter segment of comparative Example 1 is evaluated by the same method as examples 1 to 5. The results are shown in the following table 4.

TABLE 4

| Comparative Example | First Filter Segment | Second Filter Segment | Inspection Light | Transmitted Light Intensity Ratio | Determination |
|---|---|---|---|---|---|
| 1 | White Opacity 57% | White Opacity 85% | Red | 1.2 | B |
| | | | Green | 1.2 | B |
| | | | Blue | 1.2 | B |

As is clear from the results of tables 1 to 4, it was confirmed that when the transmitted light intensity ratio between the adjacent filter segments constituting each multifilter segment in examples 1 to 16 is 1.6 or greater, the determination of the good or bad regarding whether or not the length of each filter segment of each multifilter segment is a predetermined length and whether or not the face-to-face state is normal can be accurately conducted.

As described above, it was proved that a multifilter segment in which the adjacent first and second inner wrappers have CIELab color parameters different from each other can determine the good or bad regarding whether or not the length of each filter segment of the multifilter segment is a predetermined length and whether or not the face-to-face state is normal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multifilter segment comprising:
  a plurality of filter segments comprising a plurality of filter materials and inner wrappers respectively covering outer surfaces of the filter materials; and
  an outer wrapper which connects and integrates the filter segments by being wound around outer surfaces of the inner wrappers of the filter segments while end portions of the filter segments are arranged face-to-face,
  wherein the inner wrappers of the adjacent filter segments contain wood pulp having bleaching strengths different from each other,
  wherein the inner wrappers of the adjacent filter segments have CIELab color parameters different from each other,
  wherein the CIELab color parameters of the inner wrappers of the adjacent filter segments are different from each other such that a transmitted light intensity ratio is greater than or equal to 1.6 when red, blue or green light or light having a combination of two or more types passes through the adjacent filter segments,
  wherein the outer wrapper is white paper,
  wherein the outer wrapper does not affect a color transparency of the adjacent filter segments which satisfy the transmitted light intensity ratio of 1.6 or greater, and
  wherein the outer wrapper has an opacity of 70% or less.

2. A smoking article with a multifilter segment, comprising the multifilter segment of claim 1.

3. A multifilter segment inspection method comprising:
  a) a step of preparing a plurality of filter segments in which outer surfaces of filter materials are covered with inner wrappers;
  b) a step of selecting filter segments from the plurality of filter segments such that CIELab color parameters of the inner wrappers of filter segments to be adjacent to each other are different from each other, causing red, blue or green light or light having a combination of two or more types to pass through each of the filter segments to be adjacent to each other and have bleaching strengths different from each other, and measuring a transmitted light intensity in each color;
  c) a step of calculating the transmitted light intensity ratio by dividing a high transmitted light intensity in a color of one of the filter segments to be adjacent to each other by a low transmitted light intensity in the color of the other filter segment;
  d) a step of selecting a combination of filter segments in which the transmitted light intensity ratio calculated in the c) step between the filter segments to be adjacent to each other is greater than or equal to 1.6, and a color of used light in advance;
  e) a step of assembling a multifilter segment in which a plurality of filter segments are connected and integrated by winding an outer wrapper which does not affect a color transparency of the adjacent filter segments which satisfy the transmitted light intensity ratio of 1.6 or greater around outer surfaces of the inner wrappers by arranging the filter segments of the combination selected in the d) step face-to-face; and
  f) a step of causing the light of the color selected in the d) step to pass through the multifilter segment and detecting a length of the adjacent filter segments and a face-to-face state between the filter segments, wherein the outer wrapper is white paper, wherein the outer wrapper does not affect a color transparency of the adjacent filter segments which satisfy the transmitted light intensity ratio of 1.6 or greater, and wherein the outer wrapper has an opacity of 70% or less.

4. A multifilter segment comprising:

a plurality of filter segments comprising a plurality of filter materials and inner wrappers respectively covering outer surfaces of the plurality of filter materials; and an outer wrapper which connects and integrates the filter segments by being wound around outer surfaces of the inner wrappers of the plurality of filter segments while end portions of the filter segments are arranged face-to-face, wherein the inner wrappers of the adjacent filter segments contain bleached wood pulp and unbleached wood pulp having ratios of the bleached wood pulp and the unbleached wood pulp different from each other, wherein the inner wrappers of the adjacent filter segments have CIELab color parameters different from each other, wherein the CIELab color parameters of the inner wrappers of the adjacent filter segments are different from each other such that a transmitted light intensity ratio is greater than or equal to 1.6 when red, blue or green light or light having a combination of two or more types passes through the adjacent filter segments, wherein the outer wrapper is white paper, wherein the outer wrapper does not affect a color transparency of the adjacent filter segments which satisfy the transmitted light intensity ratio of 1.6 or greater, and wherein the outer wrapper has an opacity of 70% or less.

5. The multifilter segment of claim 4, wherein the outer wrapper does not affect a color transparency of the adjacent filter segments which satisfy the transmitted light intensity ratio of 1.6 or greater.

6. A smoking article with a multifilter segment, comprising the multifilter segment of claim 4.

7. The multifilter segment of claim 1, wherein the outer wrapper is resistant paper.

8. The multifilter segment of claim 4, wherein the outer wrapper is white water-resistant paper.

* * * * *